United States Patent [19]

Cassels et al.

[11] Patent Number: 5,555,237
[45] Date of Patent: Sep. 10, 1996

[54] CONTAMINATION DETECTION APPARATUS AND METHOD USING WRITE POWER CALIBRATION VALUES

[75] Inventors: Bryan A. Cassels; James J. Dente; Andrew A. Gaudet; Ian E. Henderson; Daniel J. Winarski, all of Tucson, Ariz.

[73] Assignee: International Business Machines Corporation, Armonk, N.Y.

[21] Appl. No.: 452,916

[22] Filed: May 30, 1995

[51] Int. Cl.$^6$ ........................................ G11B 7/00
[52] U.S. Cl. ........................ 369/116; 369/54; 369/44.25
[58] Field of Search .................................. 369/116, 106, 369/107, 122, 54, 44.25, 44.32, 58

[56] References Cited

U.S. PATENT DOCUMENTS

| | | | |
|---|---|---|---|
| 4,750,163 | 6/1988 | Yamamiya et al. | 369/54 |
| 4,792,933 | 12/1988 | Suzuki | 369/32 |
| 5,046,158 | 9/1991 | Groen | 341/137 |
| 5,050,156 | 9/1991 | Barton | 369/116 |
| 5,184,343 | 2/1993 | Johann et al | 369/116 |
| 5,185,733 | 2/1993 | Finkelstein et al. | 369/54 |
| 5,210,735 | 5/1993 | Hoshino et al. | 369/54 |
| 5,226,027 | 7/1993 | Bakx | 369/58 |
| 5,274,622 | 12/1993 | Kono | 369/116 |
| 5,353,270 | 10/1994 | Iimura | 369/54 |

FOREIGN PATENT DOCUMENTS

| | | | |
|---|---|---|---|
| 62-184637 | 8/1987 | Japan | G11B 7/135 |
| 62-298031 | 12/1987 | Japan | G11B 7/125 |

Primary Examiner—Loha Ben
Attorney, Agent, or Firm—Baker, Maxham, Jester & Meador

[57] ABSTRACT

A system to monitor write power calibration values in an optical drive to detect media and lens contamination, and take appropriate remedial action when contamination is found. A laser device writes data to an optical medium housed in the optical drive by imparting a laser beam upon the medium. The laser device provides the laser beam with a level of output power selected in accordance with a W/C value. A controller generates and repeatedly updates the W/C value, and provides it to the laser device. The controller samples the W/C value at selected times, and compares it to a predetermined value. If the W/C value exceeds the predetermined value, the controller executes a specific operational sequence. For example, the controller may issue a contamination warning. When the W/C value exceeds a second predetermined value, the controller may logically write-protect the optical medium, or shift the medium to another optical drive. Where the controller is implemented in an optical library with multiple optical drives, the controller may store a comprehensive list of W/C values for the drives.

23 Claims, 5 Drawing Sheets

CONTAMINATION DETECTION APPARATUS AND METHOD USING WRITE POWER CALIBRATION VALUES

BACKGROUND OF THE INVENTION

1. Field of the Invention

The present invention relates to systems that store data on optical media such as optical disks. More particularly, the invention concerns a system to monitor the power used while writing data to an optical medium to detect media and lens contamination, and take appropriate remedial action when contamination is found.

2. Description of the Related Art

Figure 1:
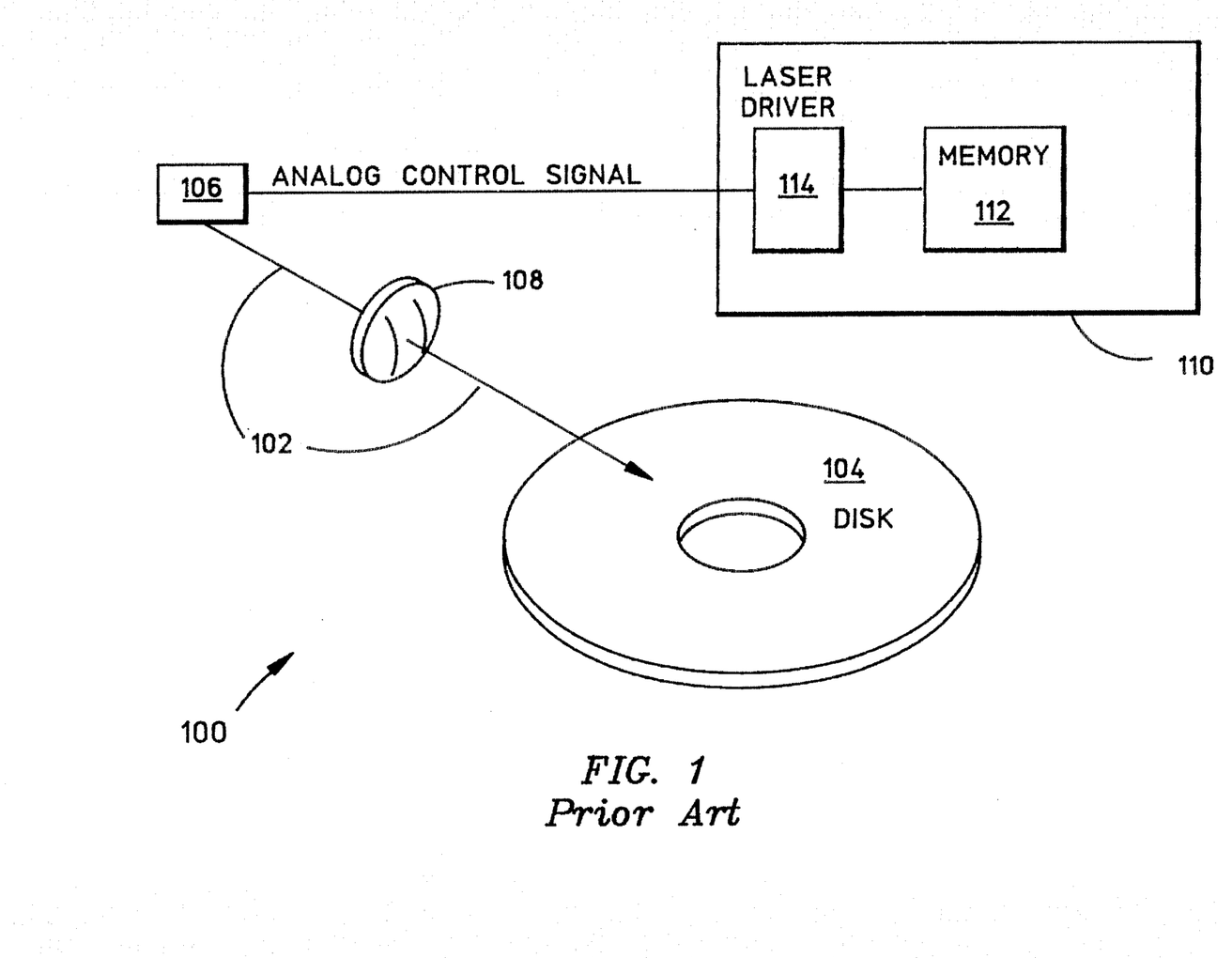
FIG. 1 is a diagram of a typical optical disk storage system.

Modern computers frequently store data on optical media such as optical disks. FIG. 1 illustrates a typical optical disk storage system 100, in which a laser beam 102 writes data to an optical disk 104. A laser device 106 generates the laser beam 102 and directs the beam 102 through an adjustable focusing lens 108. In many cases, the laser device 106 comprises a semiconductor laser. The system 100 also includes various circuitry embodied in a controller 110, which determines the power, frequency, and other operational characteristics of the laser device 106.

To successfully write data to optical media, the laser beam 102 must contain sufficient power to heat the media and thereby effect a "state change." Therefore, in a typical system 100 the controller 110 calibrates the laser device 106 to ensure that the laser beam 102 contains a sufficient level of power to write data to the disk 104. Some systems calibrate the laser device 106 by imparting the laser beam 102 upon a designated area (not shown) of the disk 104 and then measuring the disk's reflectivity. Then, in accordance with the measured reflectivity, the controller 110 performs calculations to determine an appropriate power level at which to operate the laser device 106. The controller 110 stores this value in a memory 112, in the form of a digital electrical signal. Skilled artisans refer to this digital signal as the "write-calibration laser DAC value", or "W/C" value for short. The memory 112, for example, may comprise random access memory ("RAM"). To write data to the disk 104 after the system is calibrated as described above, a laser driver 114 retrieves the digital W/C value from the memory 112, converts it to an analog control signal, and feeds the analog control signal to the laser device 106 to determine its power.

Other calibration systems also exist. For example, some systems perform a series of data writes and data reads to/from the disk 104 while counting the errors that occur. Then, the controller 110 uses the number of counted errors to compute a W/C value. The controller 110 stores the computed W/C value, and uses it to drive the laser device 106 as mentioned above. Engineers have developed various other calibration techniques, in addition to those mentioned above.

In many respects, these systems have satisfied most users' expectations. However, even if these systems perform calibration correctly, contamination of the disk 104 and/or the lens 108 can still cause errors. When the disk 104 and lens 108 are uncontaminated, the laser device 106 can successfully write to the disk 104 using a power level of 5–7 mW (as an example). However, dust and other particles may adhere to the disk 104 and/or lens 108 over time, gradually contaminating them. This contamination reduces the laser beam's effectiveness in writing data to the disk 104. Therefore, with more contamination, the laser device 106 must produce a more powerful laser beam 102.

When contamination reaches a certain level, the required power exceeds the available power, i.e. the maximum power capability of the laser device 106. The maximum available power for some laser devices may be about 12.5 mW, for example. At this point, the laser device 106 cannot produce a laser beam capable of reliably writing to the disk 106. In some cases, failure of the drive to write data can be catastrophic. For example, all files on a disk may be lost if the data to be written involves critical data such as file allocation tables.

SUMMARY OF THE INVENTION

The present invention concerns an apparatus and method to monitor W/C values in an optical drive to detect media and lens contamination, and to take appropriate remedial action when contamination is found. One embodiment of the invention comprises a method for detecting contamination in an optical drive. This method operates in an environment that includes a laser device that writes data to an optical medium housed in an optical drive by imparting a laser beam upon the medium. The laser device provides the laser beam with a level of output power selected in accordance with a W/C value. A controller generates and repeatedly updates the W/C value and provides it to the laser device. The controller also samples the W/C value at selected times, and compares it to one or more predetermined values. If the W/C value exceeds the predetermined value, the controller executes a specific operational sequence. For example, if the W/C value exceeds a first threshold, the controller may issue a contamination warning. When the W/C value exceeds a second threshold, the controller may write-protect the optical medium or transfer the medium to another optical drive. When the W/C value exceeds a third threshold, the controller may render the drive and/or the optical medium inactive, as appropriate. If the controller is implemented in an optical library with multiple optical drives, the controller may maintain a comprehensive list of W/C values for the drives.

The invention affords its users with a number of distinct advantages. For example, the invention monitors lens and media contamination and provides appropriate warnings when contamination reaches a sufficient level. Therefore, this invention enables users to clean their lenses and optical media early to thwart possible write errors. The invention also helps avoid such write errors by taking remedial action, such as shifting an optical medium to an uncontaminated optical drive, or by logically write-protecting a contaminated medium.

BRIEF DESCRIPTION OF THE DRAWINGS

The nature, objects, and advantages of the invention will become more apparent to those skilled in the art after considering the following detailed description in connection with the accompanying drawings, in which like reference numerals designate like parts throughout, wherein.

DETAILED DESCRIPTION OF THE PREFERRED EMBODIMENTS

Broadly, the invention concerns a system to detect optical media and lens contamination by monitoring the power used while writing data to the medium, and to take appropriate remedial action when contamination is found. One particularly advantageous feature of the invention is that it avoids potentially costly write errors, which may result from the inability of the drive to write data when the lens and/or medium are contaminated.

CARTRIDGE CONSTRUCTION

The present invention operates with a variety of machine-readable optical storage media. For example, such optical storage media may include write-once media, magneto-optical media, phase-change media, recordable compact disks, "floptical" media, and optical-tape. Such media may be housed individually in single-disk optical cartridges, in multi-disk cartridges, or in another configuration. To illustrate the invention, but with no limitation intended thereby the present description uses multi-disk cartridges to describe the conveyance of optical disks to and from optical drives. This type of multi-disk cartridge is described in detail in U.S. patent application Ser. No. 08/385,503, which was filed on Feb. 8, 1995 in the name of Chi-Hung Dang, and in U.S. patent application Ser. No. 08/414,248, which was filed on Mar. 31, 1995 in the names of John Kulokowski, et al. These applications are hereby completely incorporated into the present application by reference.

HARDWARE FOR CONVEYING DISKS

Figure 2:
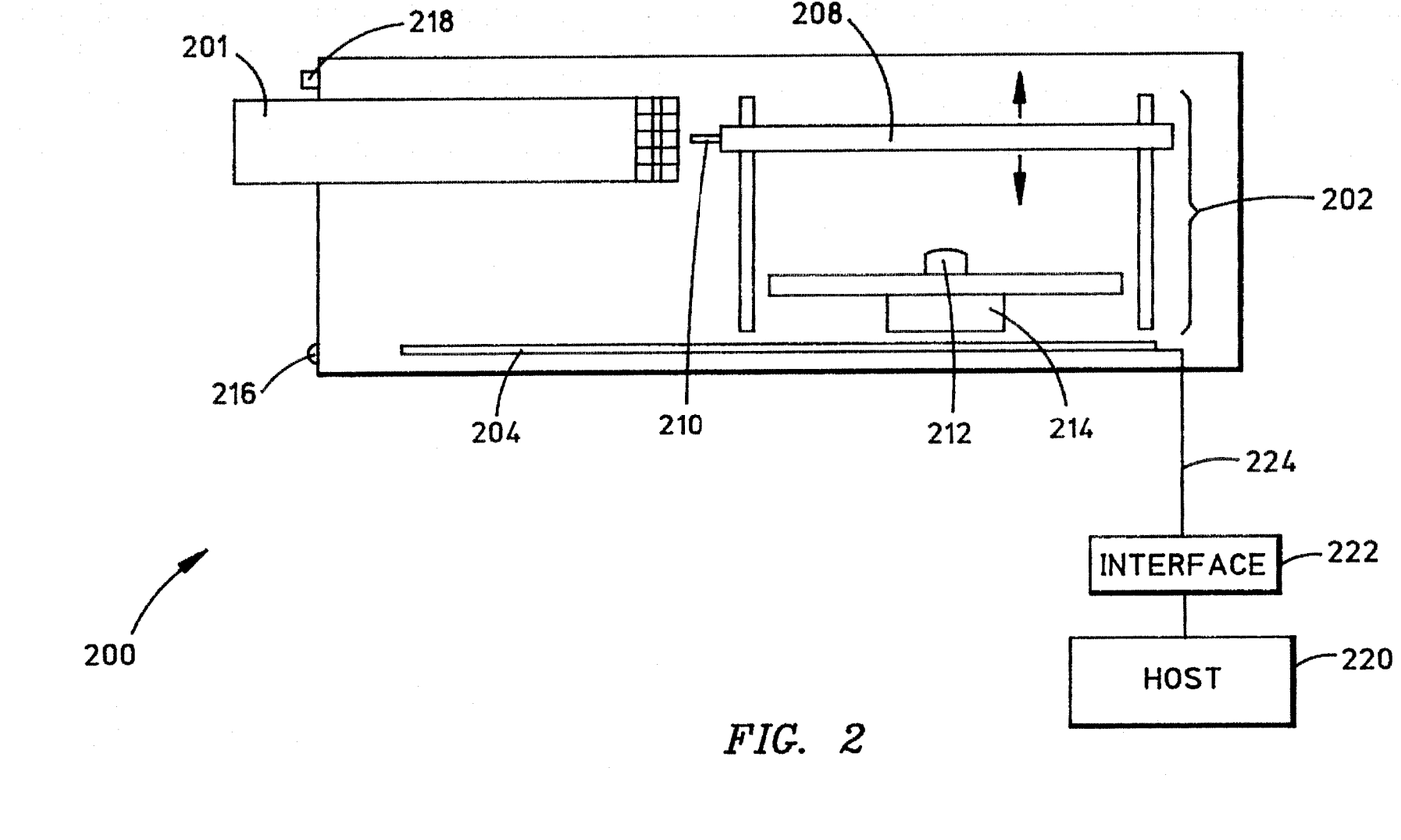
FIG. 2 is a side view of an illustrative user-operated hardware environment in which the present invention may be implemented.
Figure 3:
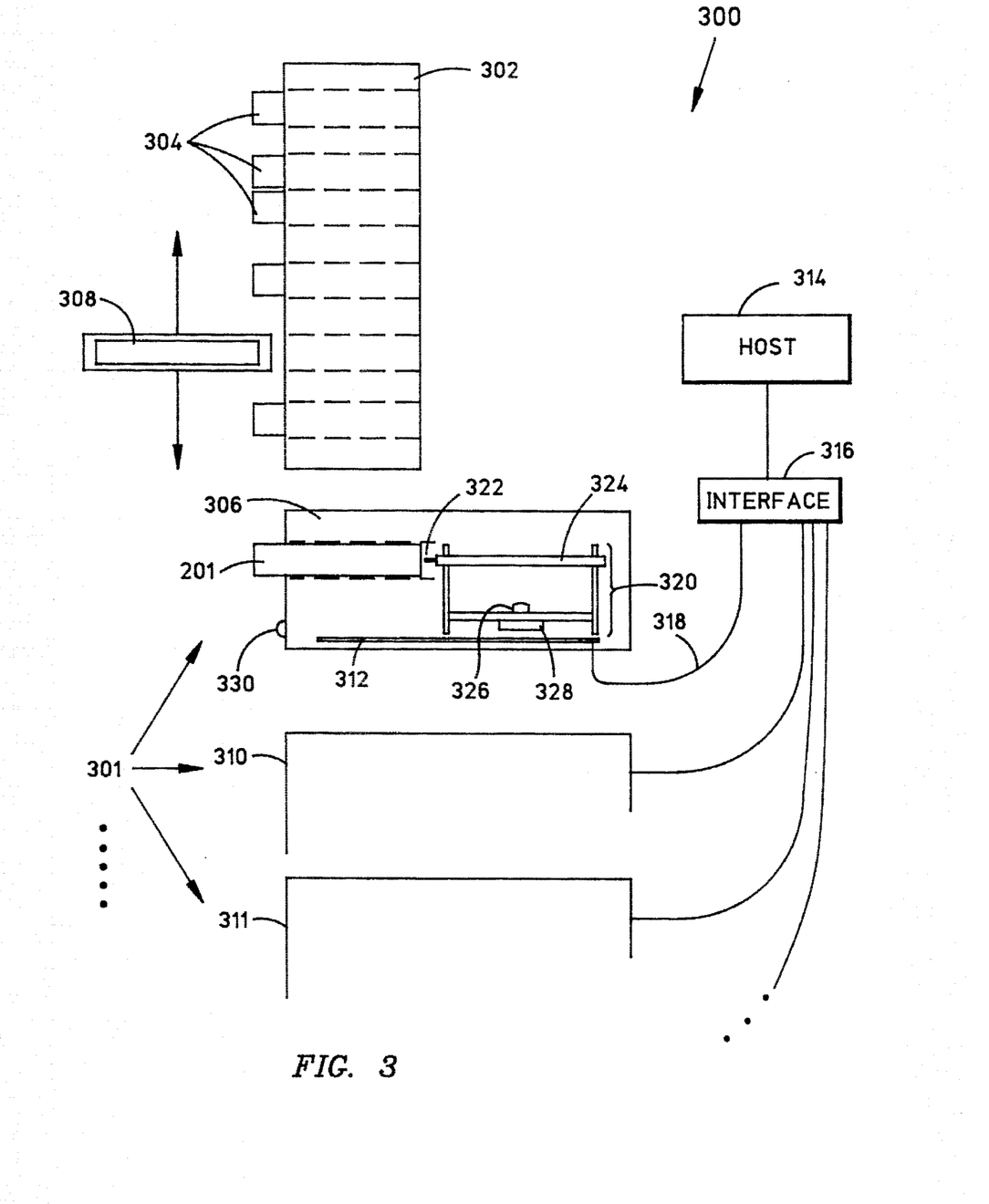
FIG. 3 is a side view of an illustrative automated disk library in which the present invention may be implemented.

The present invention may be implemented in the form of a user-operated disk drive 200 (FIG. 2) or in an automated disk library 300 (FIG. 3). FIG. 2 depicts an example of the user-operated environment, in which a human user (not shown) inserts a cartridge 201 into the optical disk drive 200. The drive 200 includes a drive controller 204 with circuitry for managing the drive's operation. The controller 204 communicates electrically with a host computer 220 via an interface 222 and a bus 224. The interface 222, in an exemplary embodiment, may comprise a SCSI interface.

The drive 200 also includes a disk picker 202, which transfers disks, one at a time, between the cartridge 201 and a spindle 212. More specifically, a gripper 210 individually selects a tray containing a desired disk to remove the disk from the cartridge 201. Then, an elevator 208 lowers the disk onto a spindle 212 which is rotated by the motor 214 to spin the disk. The drive controller 204 controls operation of the disk picker 202, the spindle 212, and the motor 214.

The drive 200 may include a display 216 at an easily visible location on or near the drive 200. As an example, the display 216 may be illuminated with a predetermined pattern when a disk has been loaded on the spindle 212, or when the disk picker 202 is in the process of loading or unloading a disk. The face of the drive 200 also includes an unload button 218. The user presses the unload button 218 to remove the cartridge 201 from the drive 200 because, as discussed in greater detail in the Kulakowski application, the cartridge 201 may be locked into position in the drive 200.

In contrast to the user-operated disk drive 200 (FIG. 2), the automated disk library 300 (FIG. 3) includes a large bin 302 containing a plurality of cartridges 304, which are conveyed to one or more disk drives 301 by a library picker 308. The library picker 308 may comprise, for example, a robotic arm such as that used in the IBM Model 3495 Tape Library System.

The drives 301 may comprise drives with similar components as the drive 200. For example, the drive 306 includes a drive controller 312 that is electrically connected to a host computer 314 via an interface 316 and a bus 318. The drive 306 also includes a disk picker 320, an elevator 324 with a disk gripper 322, a spindle 326, a motor 328, and a display 330. However, in the automated disk library environment, the unload button 218 (FIG. 2) is not necessary because the cartridges 304 are inserted into and removed from the drives 301 by the library picker 308 rather than a human hand. In substitution for the function of the unload button 218, the host 314 may issue an "unload" command to the drives 301 via the interface 316. Where there are multiple drives 301 (as illustrated), the drives may be connected to the same host.

DRIVE CONTROLLER

Figure 4:
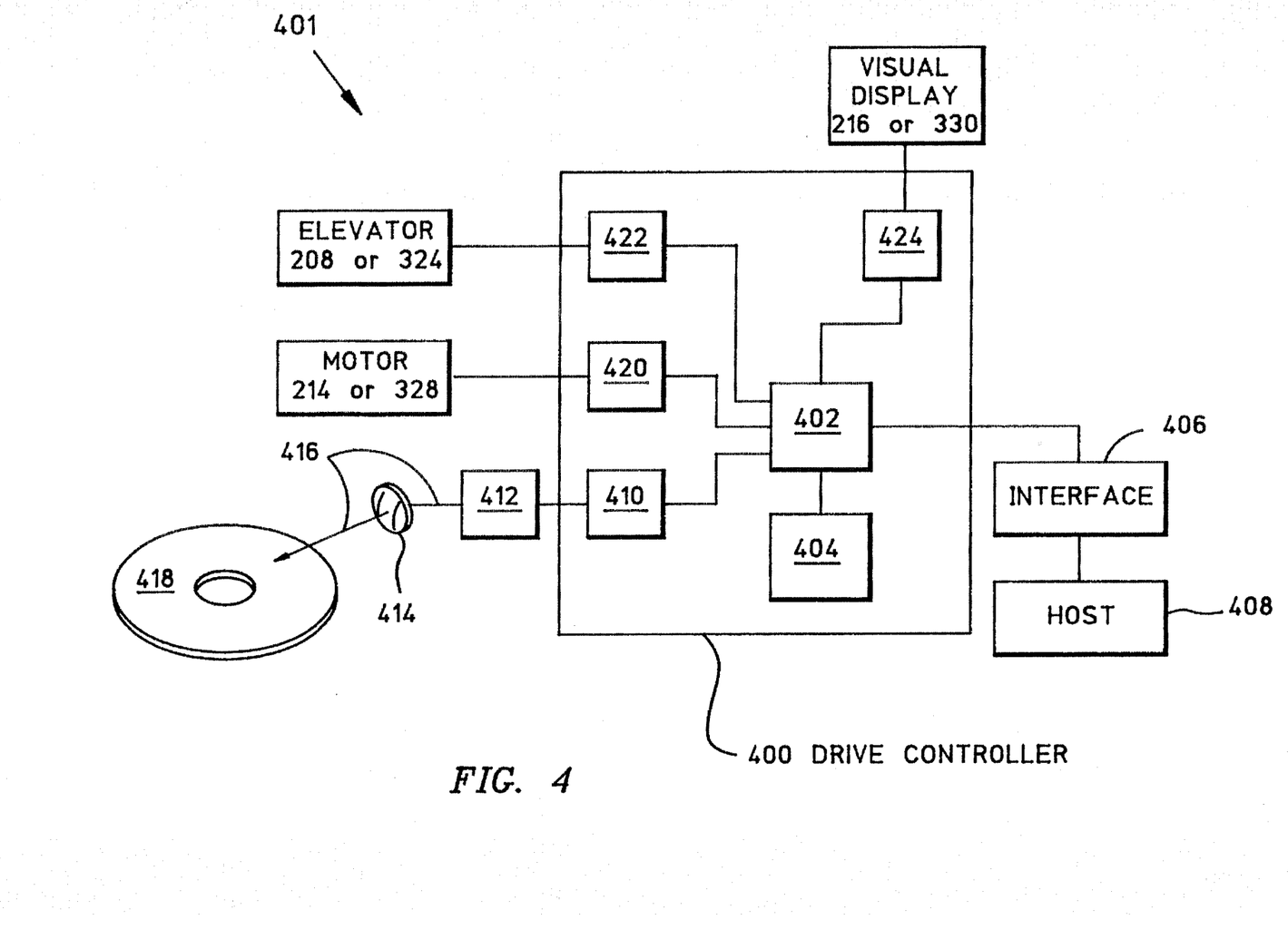
FIG. 4 is a detailed schematic illustration of the circuitry of a drive controller of the invention.

FIG. 4 illustrates the components of an optical drive 401, including various hardware components and interconnections of a drive controller 400. The drive controller 400 may be implemented in a user-operated drive 200 (in the form of the controller 204), or in an automated drive 301 (in the form of a controller 312, for example). The drive controller 400 includes a processor 402 and a memory 404; as an example, these components may comprise a microprocessor and a RAM circuit, respectively.

The processor 402 is electrically connected to an interface 406 and a host 408. Depending upon whether the drive controller 400 is implemented in a user-operated embodiment (FIG. 2) or the automated library environment (FIG. 3), the interface 406 and host 408 may comprise the interface 222 and host 220, or the interface 316 and host 314, respectively. The processor 402 is also connected to a number of drivers, which convert electronic commands from the processor 402 into appropriate levels of electrical current or voltage to operate peripheral components of the optical drive 401.

For example, the processor 402 is electrically connected to a laser driver 410, which is connected to a laser device 412 and a lens 414. In accordance with instructions from the processor 402, the laser driver 410 provides an appropriate input signal for the laser device 412 to generate a laser beam 416 with desired characteristics. The laser beam 416 impinges upon the lens 414, which focuses the beam 416 onto an optical media 418. The optical media 418 comprises an optical disk in the present illustration. The drive controller 400 also includes a motor driver 420, electrically connected to the processor 402. The motor driver 420 provides appropriate electrical signals to a drive motor (such as the motor 214 or 328 of FIG. 2 or 3, respectively), to rotate the motor as desired. The drive controller 400 also includes a picker driver 422 connected to the processor 402. The picker driver 422 provides appropriate electrical signals to a picker (such as the picker 202 or 320 of FIG. 2 or 3, respectively), to operate the picker as desired. The drive controller 400 also includes a display driver 424 connected to the processor 402. The display driver 424 provides electrical signals to a display such as the display 216 or 330 (FIG. 2 or 3, respectively), to operate the display as desired.

OPERATION

Figure 5:
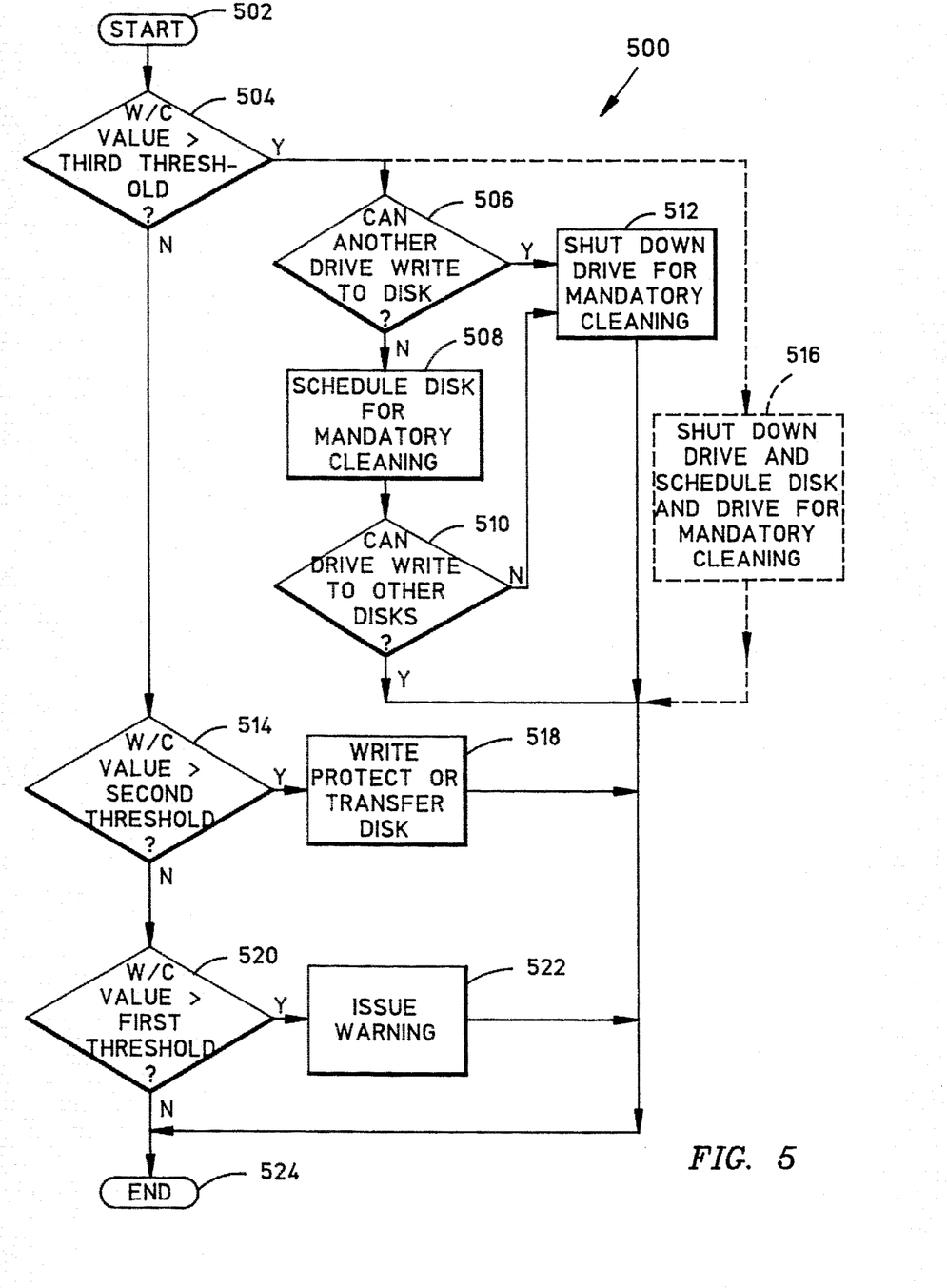
FIG. 5 is a flowchart depicting a sequence of tasks implementing an exemplary method of the present invention.

In addition to the hardware components and interconnections described above, the present invention also includes a method to detect media and lens contamination in an optical drive, and take appropriate remedial action when contamination is found. FIG. 5 illustrates a sequence of tasks 500 that illustrate an exemplary embodiment of the method of the invention. For ease of explanation, the following description is made in the context of the automated disk library 300, illustrated in FIG. 3. However, these tasks 500 may be adapted to another environment, such as the user-operated library 200 (FIG. 2), by an ordinarily skilled artisan having the benefit of this disclosure.

The routine 500 begins in task 502. In a first embodiment, the routine 500 may be executed by the drive controller of an optical drive, to regulate activity occurring locally at that drive. For example, the drive controller 312 may execute the routine 500 to manage operation of the drive 306. In a second embodiment, the host 314 may execute the routine 500 separately for each of the drives 301 connected to the host 314.

For ease of explanation, the present description will refer to the second embodiment, where the host 314 executes the routine 500 on behalf of each drive 306, 310 and 311 connected to the host 314. More particularly, the present description is made in the exemplary context of the drive 306 and an optical disk mounted therein. The host 314 executes the routine 500 each time the drive 306 performs write calibration. Although write calibration may be performed at various times, this task is commonly performed in situations such as: (1) initially, when a write operation first begins, (2) at selected times during a write error recovery procedure, and (3) at selected times during long write workloads. Although write calibration may be performed by the host for each drive, it is typically performed individually by each drive.

After the drive 306 performs a write calibration, then, the host 314 initiates task 502 to begin the routine 500. After task 502, queries 504, 514, and 520 compare the W/C value with three corresponding thresholds, shown below in Table 1.

TABLE 1

| W/C Threshold | W/C Value |
|---|---|
| 1st | 7.5 mW |
| 2nd | 10 mW |
| 3rd | 12.5 mW |

The first, second, and third thresholds correspond to W/C values of 7.5 mW, 10 mW, and 12.5 mW, respectively. As recognized by the present inventors, the W/C value necessarily increases as contamination of the lens and/or optical media increases. Therefore, as described more completely below, queries 504, 514, and 520 initiate different remedial actions depending upon the severity of the contamination indicated by the W/C value.

More particularly, query 504 asks whether the W/C value exceeds the third threshold, which is 12.5 mW in the present example. If so, contamination of the lens and/or disk has reached an extreme level, which may interfere with the drive's ability to write data to the media. Accordingly, query 506 asks whether it is possible for another drive to write data to the disk. The host 314 may make this determination, for example, by maintaining a matrix in memory that represents the most recent W/C values of each of the drives 301. If another drive has a lower W/C value, and the disk is not sufficiently contaminated to prevent writing new data to the disk, task 512 is performed. Specifically, the host 314 in task 512 transfers the disk to another one of the drives 301 and effectively shuts down the contaminated drive 306 and schedules it for a mandatory cleaning.

If, however, query 506 determines that contamination of the optical media is sufficiently severe that none of the other drives 301 is capable of writing data to the disk, task 508 returns the disk to storage and schedules the disk for a mandatory cleaning. Preferably, the host 314 maintains a matrix of contamination estimates for all disks, along with corresponding recommendations for cleaning the disks where applicable. After task 508, query 510 asks whether the drive 306 is sufficiently free from contamination to permit the drive 306 to write to other, less contaminated, disks. If so, the routine 500 ends in task 524. However, if the drive 306 is sufficiently contaminated that it is incapable of writing to another disk, the routine 500 advances to task 512, wherein the drive 306 is shut down and scheduled for a mandatory cleaning. After task 512, the routine 500 ends in task 524.

In an alternative embodiment, instead of performing steps 506, 508, 510, and 512, the routine 500 may perform task 516. Specifically, after query 504 determines that the W/C value exceeds the third threshold, the host 314 in task 516 shuts down the drive 306 and schedules both the drive and the disk for a mandatory cleaning. After task 516, the routine 500 ends in task 524.

If query 504 determines that the W/C value falls short of the third threshold, control advances to query 514, which asks whether the W/C value exceeds the second threshold. If so, this signifies a level of contamination that is serious, albeit not as extreme as contamination detected by query 504. If query 514 answers "yes," then task 518 logically write-protects the disk. Specifically, the host 314 in task 518 prevents the drive 306 from writing data to the disk. Alternatively, in an automated disk library, the host 314 may instead operate the library picker 308 to transfer the disk to another drive 310. After task 518, the routine 500 ends in task 524.

If query 514 finds that the W/C value is less than the second threshold, query 520 is performed. Query 520 asks whether the W/C value exceeds the first (and lowest) threshold. If so, task 522 merely issues a warning. The warning of task 522 may comprise, for example, a step of blinking the display 330 in a predetermined pattern, such as a single illumination alternating with a double illumination. After task 522, the routine 500 ends in task 524.

While there have been shown what are presently considered to be preferred embodiments of the invention, it will be apparent to those skilled in the art that various changes and modifications can be made herein without departing from the scope of the invention as defined by the appended claims.

What is claimed is:

1. A method for managing an optical drive including a laser device that writes data to an optical medium housed in the optical drive by imparting a laser beam upon the medium, where the laser device provides the laser beam with a level of output power selected in accordance with a write calibration (W/C) value generated and repeatedly updated by a controller and provided to the laser device, said method comprising the steps of:

sampling the W/C value at selected times;

comparing the W/C value to a first predetermined value; and operating the optical drive to execute a first predetermined operational sequence when the W/C value exceeds the first predetermined value.

2. The method of claim 1, wherein the first predetermined operational sequence comprises the steps of issuing a predetermined warning message perceptible to a human.

3. The method of claim 2, wherein the optical drive includes a display and the issuing step comprises the steps of presenting a predetermined warning message upon the display.

4. The method of claim 3, wherein the display comprises a light-emitting element and the issuing step comprises the steps of blinking the light-emitting element in a predetermined pattern.

5. The method of claim 2, further comprising the steps of:

comparing the W/C value to a second predetermined value; and operating the optical drive to execute a second predetermined operational sequence when the W/C value exceeds the second predetermined value.

6. The method of claim 5, wherein the second predetermined operational sequence comprises the steps of inhibiting the optical drive from writing to the optical medium housed in the optical drive.

7. The method of claim 5, wherein the optical drive is part of an optical library that includes at least one other optical drive, and the second predetermined operational sequence comprises the steps of transferring the optical medium to one of the at least one other optical drive of the library.

8. The method of claim 1, wherein the first predetermined operational sequence comprises the steps of inhibiting the optical drive from writing to the optical medium housed in the optical drive.

9. The method of claim 1, wherein the optical drive is part of an optical library that includes at least one other optical drive, and the first predetermined operational sequence comprises the steps of transferring the optical medium to one of the at least one other optical drive of the library.

10. The method of claim 1, wherein the optical drive is part of an optical library that includes multiple other optical drives, and each optical drive includes a respective laser device that writes data to an optical medium housed therein by imparting a laser beam upon the medium, where each laser device provides a laser beam with a level of output power selected in accordance with a W/C value generated and repeatedly updated by a corresponding controller and provided to the laser device, wherein said method further comprises the steps of:

sampling W/C values of each optical drive at selected times; and storing a record of the W/C values in memory.

11. The method of claim 10, wherein the first predetermined operational sequence comprises the steps of:

identifying one of the multiple other optical drives with a W/C value less than a predetermined value; and transferring the optical medium to the identified optical drive.

12. A method for managing an optical drive including a laser device that writes data to an optical medium by imparting a laser beam upon the medium, where the laser device provides the laser beam with a level of output power selected in accordance with a write calibration (W/C) value received by the laser device, said method comprising the steps of:

operating a controller to generate and repeatedly update the W/C value;

providing the W/C value to the laser device;

sampling the W/C value at selected times;

comparing the W/C value to a first predetermined value; and operating the optical drive to execute a predetermined operational sequence when the W/C value exceeds the first predetermined value.

13. An apparatus for managing in an optical drive, comprising:

a laser device to write data to an optical medium by imparting upon the medium a laser beam having a level of output power selected in accordance with a write calibration (W/C) value received by the laser device;

a controller coupled to the laser device and programmed to perform method steps comprising:
generating and repeatedly updating the W/C value;
providing the W/C value to the laser device;
comparing the W/C value to a first predetermined value; and
operating the optical drive to execute a first predetermined operational sequence when the W/C value exceeds the first predetermined value.

14. The apparatus of claim 13, wherein the controller is programmed such that the first predetermined operational sequence comprises the steps of issuing a predetermined warning message perceptible to a human.

15. The apparatus of claim 14, wherein the optical drive includes a display and the controller is programmed such that issuing step comprises the steps of presenting a predetermined warning message upon the display.

16. The apparatus of claim 15, wherein the display comprises a light-emitting element and the controller is programmed such that the issuing step comprises the steps of blinking the light-emitting element in a predetermined pattern.

17. The apparatus of claim 14, wherein the optical drive is part of an optical library that includes multiple other optical drives, and each optical drive includes a respective laser device that writes data to an optical medium housed therein by imparting a laser beam upon the medium, where each laser device provides a laser beam with a level of output power selected in accordance with a W/C value generated and repeatedly updated by a corresponding controller and provided to the laser device, wherein said controller is further programmed to perform the steps of:

sampling W/C values of each optical drive at selected times; and storing a record of the W/C values in memory.

18. The apparatus of claim 17, wherein the controller is programmed such that first predetermined operational sequence comprises the steps of:

identifying one of the multiple other optical drives with a W/C value less than a third predetermined value; and transferring the optical medium to the identified optical drive.

19. The apparatus of claim 14, wherein the controller is further programmed to perform the steps of:

comparing the W/C value to a second predetermined value; and operating the optical drive to execute a second predetermined operational sequence when the W/C value exceeds the second predetermined value.

20. The apparatus of claim 19, wherein the controller is programmed such that the second predetermined operational sequence comprises the steps of inhibiting the optical drive from writing to the optical medium housed in the optical drive.

21. The apparatus of claim 19, wherein the optical drive is part of an optical library that includes at least one other optical drive, and the controller is programmed such that the second predetermined operational sequence comprises the steps of transferring the optical medium to one of the at least one other optical drive of the library.

22. The apparatus of claim 13, wherein the controller is programmed such that the first predetermined operational sequence comprises the steps of inhibiting the optical drive from writing to the optical medium housed in the optical drive.

23. The apparatus of claim 13, wherein the optical drive is part of an optical library that includes at least one other optical drive, and the controller is programmed such that the first predetermined operational sequence comprises the steps of transferring the optical medium to one of the at least one other optical drive of the library.

* * * * *